(12) United States Patent
Jost et al.

(10) Patent No.: US 10,017,223 B2
(45) Date of Patent: Jul. 10, 2018

(54) TRANSPORTATION VEHICLE

(71) Applicants: Suprimmo S.A., Bettange/Mess (LU); Shengzhou Zhonggong Electrical, Ltd, Shengzhou (CN)

(72) Inventors: Gilbert Jost, Bettange/Mess (LU); Hongliang Chen, Shengzhou (CN)

(73) Assignee: SUPRIMMO S.A., Bettange/Mess (LU)

(*) Notice: Subject to any disclaimer, the term of this patent is extended or adjusted under 35 U.S.C. 154(b) by 2 days.

(21) Appl. No.: 15/054,389

(22) Filed: Feb. 26, 2016

(65) Prior Publication Data

US 2017/0247077 A1 Aug. 31, 2017

(51) Int. Cl.
*B62K 5/00* (2013.01)
*B62K 5/025* (2013.01)
*B62K 15/00* (2006.01)

(52) U.S. Cl.
CPC .......... *B62K 5/025* (2013.01); *B62K 15/006* (2013.01); *B62K 2015/005* (2013.01)

(58) Field of Classification Search
CPC . B62K 5/025; B62K 15/006; B62K 2015/005
See application file for complete search history.

(56) References Cited

U.S. PATENT DOCUMENTS 3,513,924 A * 5/1970 Jackson ............... B62K 5/025
180/14.1

FOREIGN PATENT DOCUMENTS

CN 105083438 * 11/2015
CN 105599839 * 5/2016

* cited by examiner

*Primary Examiner* — Kevin Hurley
(74) *Attorney, Agent, or Firm* — Steven M. Shape; Dennemeyer & Associates, LLC

(57) ABSTRACT

A transportation vehicle is disclosed, including front frame and rear frame. The front frame and rear frame are hinged together and the rear frame can swing left and right with respect to the front frame; the two sides of the front frame are provided with two wheel hub axles, and the driven wheels are connected to the front frame through the wheel hub axles; the rear frame is provided with a vertically configured connecting rod; the connecting rod is flexibly connected to the middle portion of the first push-pull rod, and the two ends of the first push-pull rod can swing up and down; the two ends of the first push-pull rod are respectively connected to the wheel hub axles through the rocker arm connecting rod mechanism. Through configurations of the first push-pull rod, wheel hub axles and rocker arm connecting rod mechanisms, when the transportation vehicle is making a turn, the gravity component of the human body and vehicle can offset the centrifugal force generated by the human body and vehicle. As a result, the present invention strengthens the anti-tumble capability of the transportation vehicle during turning, and enhances the stability and safety of the transportation vehicle in usage.

11 Claims, 10 Drawing Sheets

TRANSPORTATION VEHICLE

BACKGROUND OF INVENTION

1. Field of the Invention

The present invention relates generally to a transportation vehicle.

2. Description of Related Art

China Patent CN104210594A disclosed a two-wheel self-balancing vehicle, comprising vehicle body, wheels symmetrically provided on the two sides of the vehicle body, connecting rod provided in the center of the vehicle body, motor provided inside the wheel, main controller, and motor controller. Above the connecting rod, a handle is provided, below the connecting rod, an axle is provided, and the connecting rod is connected to the center of the vehicle body through the axle. Inside the axle, a steering potentiometer is provided to collect steering signals from the handle.

When driving this kind of transportation vehicle, the user grips the handle above the connecting rod and steers the vehicle by turning the handle. The user can control the traveling speed of the vehicle by leaning forward or backward.

However, when driving this kind of transportation vehicle, especially in case of abrupt turns, the centrifugal force generated by the vehicle and user may cause accidental tumbles of the driver and vehicle. Therefore, it is quite unsafe.

SUMMARY OF THE INVENTION

The technical problem to be solved by the present invention is to overcome the unsafe defects of the prior art and provide a transportation vehicle that can improve the driving safety The technical scheme of the present invention is provide a transportation vehicle, comprising: a front frame (1) and a rear frame (2), the rear frame (2) connected with a driving wheel (3), the front frame (1) having two driven wheels (4) disposed on both sides thereof; wherein the front frame (1) and the rear frame (2) are hinged together and the rear frame (2) can swing left and right with respect to the front frame (1), the front frame (1) having a handle (5) connected thereto and two wheel hub axles (6) disposed on both sides thereof; the driven wheels (4) being connected to the front frame (1) through the wheel hub axles (6); wherein the rear frame (2) comprises a vertically configured connecting rod (10) and a first push-pull rod (7) flexibly connected to a middle portion of the connecting rod (10), the first push-pull rod (7) having two ends capable of swinging up and down; wherein the two ends of the first push-pull rod (7) are respectively connected to the wheel hub axles (6) through a rocker arm connecting rod mechanism, and when the rear frame (2) swings toward one of the wheel hub axles (6), through synchronous motion of the first push-pull rod (7), the rocker arm connecting rod mechanism close to this wheel hub axle (6) will drive the wheel hub axle (6) to swing upward, and the other rocker arm connecting rod mechanism will drive the other wheel hub axle (6) to swing downward.

Wherein the rocker arm connecting rod mechanism comprises a rocker arm (8) and a bar-shaped, vertically configured second push-pull rod (9), a first push-pull rod (7), a rocker arm (8); the second push-pull rod (9) and the wheel hub axle (6) being connected serially; a folding position of the rocker arm (8) being hinged to the front frame (1), and the hinge point between the rocker arm (8) and front frame (1) being located between the connecting point of the first push-pull rod (7) and rocker arm (8) and the connecting point of the rocker arm (8) and second push-pull rod (9).

Wherein the rear frame (2) comprises a subframe (2a) and a long bar-shaped main frame (2b); the driving wheel (3) is configured on the main frame (2b), the main frame (2b) is hinged to the subframe (2a) and the main frame (2b) can swing up and down with respect to the subframe (2a), the subframe (2a) is hinged to the front frame (1) and the subframe (2a) can swing left and right with respect to the front frame (1), and between the main frame (2b) and subframe (2a), a locking mechanism is provided to control tumbling of the main frame (2b) relative to the subframe (2a).

Wherein the locking mechanism comprises a locking piece (11) configured on the subframe (2a), and the main frame (2b) is provided with two locking slots (2c) for the locking piece (11) inserted therein, and when the locking piece (11) is inserted into different locking slots (2c) on the main frame (2b), the main frame (2b) and subframe (2a) are folded or unfolded; a spring is provided on the subframe (2a); the two ends of the spring are respectively connected to the subframe (2a) and locking piece (11); under the force of the spring, the locking piece (11) has a tendency to insert into the locking slot (2c).

Wherein the main frame (2b) comprises a support rod (12) configured on one end of hinging to the subframe (2a); one end of the support rod (12) is fixed on the main frame (2b), the other end of the support rod (12) is provided with a support wheel (13); when the main frame (2b) is folded, the support rod (12) will extend out of the main frame (2b).

Wherein said handle (5) comprises two vertically configured vertical bars (5a) and a horizontal bar (5b) positioned on top of and between the two vertical bars (5a), the lower ends of the vertical bars (5a) both being fixed on the front frame (1), and the two ends of the horizontal bar (5b) being fixed with the top ends of the two vertical bars (5a).

Wherein the top end of the vertical bars (5a) is provided with a bent portion (5c), the bent portion (5c) being bent toward the rear frame (2).

Wherein the wheel hub axle (6) includes a bar-shaped connecting portion (6a), a rocker arm portion (6b) and a support portion (6c); the connecting portion (6a) is configured horizontally and fixed on the front frame (1) in the axial direction; the two ends of the rocker arm portion (6b) are respectively connected to the connecting portion (6a) and support portion (6c); the driven wheels (4) are equipped on the support portions (6c); the axial line of the two support portions (6c) is parallel to the axial line of the connecting portion (6a), and the support portions (6c) can swing around the axial line of the connecting portion (6a), and drive the driven wheels (4) to move up and down.

Wherein the middle portion of the first push-pull rod (7) is hinged to the middle portion of the connecting rod (10).

Wherein the connecting portion (6a) of the wheel hub axle (6) is fixed on the front frame (1) through two bearings (14), and the two bearings (14) are respectively equipped on the two ends of the connecting portion (6a).

Wherein the wheel hub axle (6) includes the connecting portion (6a), the rocker arm portion (6b) and the support portion (6c); the second push-pull rod (9) is connected to the support portion (6c) through the rocker arm portion (6b); the connecting portion (6a) is hinged to the front frame (1); and the connecting portion (6a) is located between the connecting point of the second push-pull rod (9) and rocker arm portion (6b) and the connecting point of the rocker arm portion (6b) and support portion (6c).

Wherein the first push-pull rod (7) defines as a universal steering structure; the universal steering structure includes left pull rod (7-1) and right pull rod (7-2); the inner sides of the left pull rod (7-1) and right pull rod (7-2) are configured with rod-end knuckle bearings; the inner ring body (7-5) of the rod-end knuckle bearing on the inner side of the left pull rod (7-1) is fixed and connected to the inner ring body (7-4) of the rod-end knuckle bearing on the inner side of the right pull rod (7-2) to form an integral body, which is then connected to the connecting rod (10).

Wherein the connecting portion (6a) between the rocker at arm portion (6b) and front frame (1) are provided on the front frame (1) through two bearings (14), and the two bearings (14) are respectively equipped on the two ends of the connecting portion (6a).

Compared with the prior art, the utility model has the beneficial effects are that:

Through configurations of the first push-pull rod, wheel hub axles and rocker arm connecting rod mechanisms, when the transportation vehicle is making a turn, the gravity component of the human body and vehicle can offset the centrifugal force generated by the human body and vehicle. As a result, the present invention strengthens the anti-tumble capability of the transportation vehicle during turning, and enhances the stability and safety of the transportation vehicle in usage.

When traveling forward or making a turn, the present invention can ensure the anti-tumble capability of the user as well as the transportation vehicle and avoid accidental tumbles of the user and the vehicle. Hence, driving is safer.

DETAILED DESCRIPTION OF THE INVENTION

Figure 1:
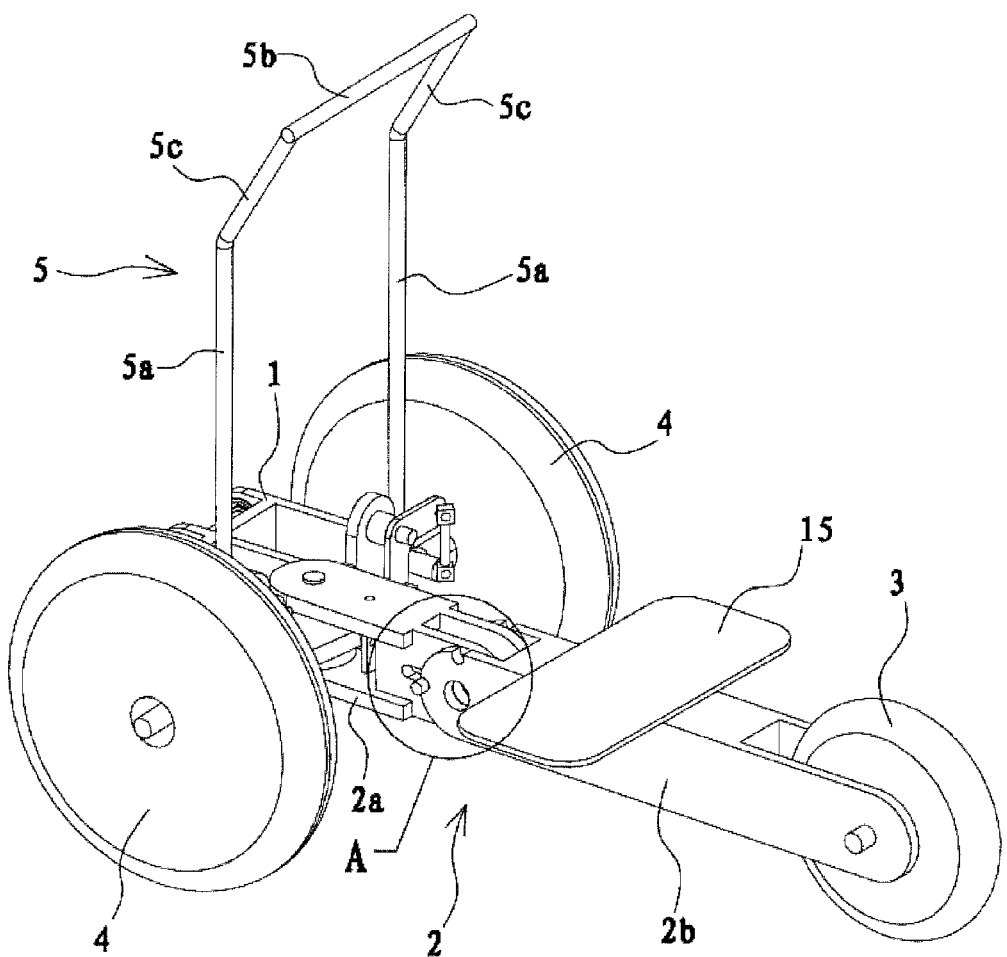
FIG. 1 is a schematic perspective view of the transportation vehicle of the present invention.
Figure 3:
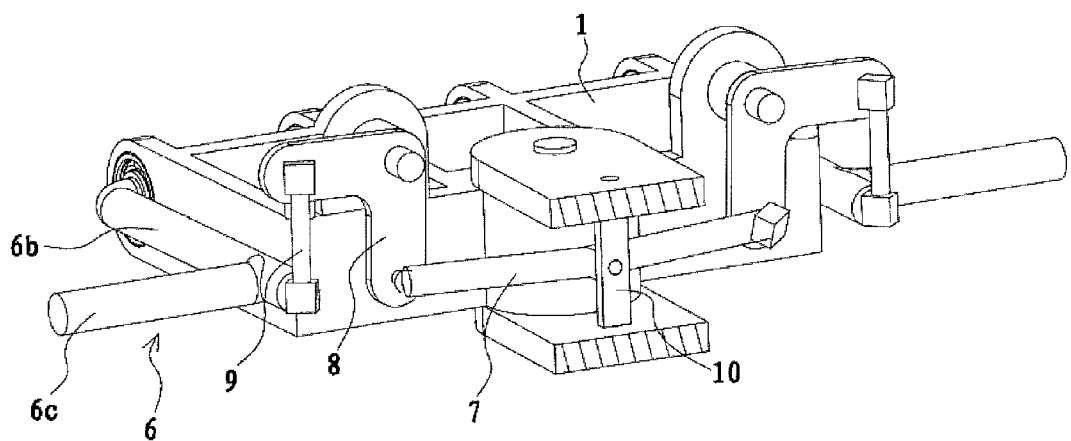
FIG. 3 is a schematic view of the rocker arm connecting rod mechanism of the present invention.
Figure 4:
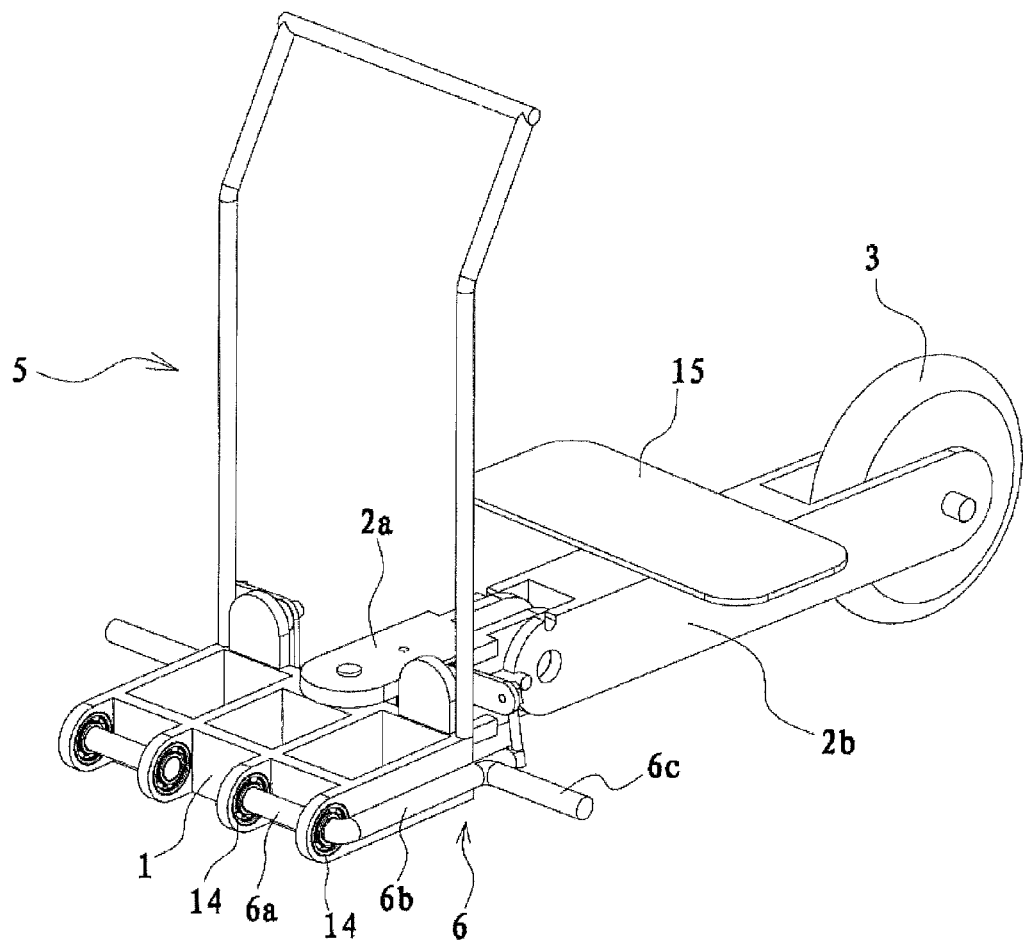
FIG. 4 is a schematic perspective view of the present invention from another angle.

The two sides of the front frame 1 is provided with two driven wheels 4, the front frame 1 and rear frame 2 are hinged and the rear frame 2 can swing left and right with respect to the front frame 1, i.e., the axle at the hinge position between the front frame 1 and rear frame 2 is vertical;

A handle 5 is provided above the front frame 1, and the handle 5 is fixed with the front frame 1; particularly, the handle 5 is a portal type frame, comprising two vertically configured vertical bars 5a and a horizontal bar 5b positioned on top of and between the two vertical bars 5a, the lower ends of the vertical bars 5a both being fixed on the front frame 1, and the two ends of the horizontal bar 5b being fixed with the top ends of the two vertical bars 5a;

As the handle 5 is a portal type frame, and the connecting points between the lower ends of the two vertical bars 5a and the front frame 1 are spaced with a long distance, when the vehicle is used, the two connecting points are subject to forces at the same time, so the connection between the handle 5 and the front frame 1 is strong, and the handle 5 will not be damaged easily;

When the transportation vehicle is making a turn, one of the vertical bars 5a will be closer to the driver's leg, but meanwhile, the gripping position on the handle 5 cannot be too far from the driver's body, therefore the top end of the vertical bars 5a is provided with a bent portion 5c, the bent portion 5c being bent toward the rear frame 2; in this way, when the transportation vehicle is making a turn, it can maintain sufficient space for the leg, and short distance between the horizontal bar 5b and the human body. This not only provides convenience, but ensures safety in driving the transportation vehicle;

The handle 5 is provided with a switch to control the rotational speed of the driving wheel 3, the switch being positioned on the horizontal bar 5b;

As depicted in FIG. 3, the two sides of the front frame 1 are provided with two wheel hub axles 6. The two wheel hub axles 6 are respectively corresponding to the two driven wheels 4. The driven wheels 4 are connected to the front frame 1 through the wheel hub axles 6; the wheel hub axles 6 include bar-shaped connecting portion 6a, rocker arm portion 6b and support portion 6c. The connecting portion 6a is configured horizontally and fixed on the front frame 1 in the axial direction; the two ends of the rocker arm portion 6b are respectively connected to the connecting portion 6a and support portion 6c. The driven wheels 4 are equipped on the support portion 6c. In this way, the whole wheel hub axle 6 can swing around the axial line of the connecting portion 6a, and drive the driven wheels 4 to move upward or downward;

As depicted in FIG. 4, in order to realize more stability in the swing of the wheel hub axle 6, and more stability in the structure of the driven wheels 4 during rotation, the connecting portion 6a of each wheel hub axle 6 is fixed on the front frame 1 through two bearings 14, and the two bearings 14 are respectively equipped on the two ends of the connecting portion 6a; such a structure can make the swing of the wheel hub axle 6 more stable, and the structure of the driven wheels 4 more stable during rotation.

The rear end of the rear frame 2 is connected with a driving wheel 3, the driving wheel 3 being driven by a motor; the upper side of the middle portion of the rear frame 2 is fixed with a footboard 15 for stepping;

As depicted in FIG. 3, the rear frame 2 is provided with a bar-shaped first push-pull rod 7, and the middle portion of the first push-pull rod 7 is connected on the rear frame 2; particularly, the rear frame 2 is configured with a vertical connecting rod 10, the connecting rod 10 being vertically fixed on the rear frame 2, while the middle portion of the first push-pull rod 7 is hinged on the middle portion of the connecting rod 10; that is to say, the connecting rod 10 can only rotate around its own axial line, and cannot move with respect to the rear frame 2 along its axial line;

By providing connecting rods 10 and hinging the first push-pull rod 7 on the middle portion of the connecting rod 10, the present invention realizes more flexible motion of the first push-pull rod 7 when using the transportation vehicle.

The two ends of the first push-pull rod 7 are respectively connected to the two wheel hub axles 6 through two rocker arm connecting rod mechanisms configured on the front frame 1, and when the first push-pull rod 7 moves together with the rear frame 2 toward either of the wheel hub axles 6, the rocker arm connecting rod mechanism close to this wheel hub axle 6 will drive this wheel hub axle 6 to swing upward, the other rocker arm connecting rod mechanism will drive the other wheel hub axle 6 to move downward;

Through configurations of the first push-pull rod 7, wheel hub axles 6 and rocker arm connecting rod mechanisms, when the transportation vehicle is making a turn, the gravity component of the human body and vehicle can offset the centrifugal force generated by the human body and vehicle. As a result, the present invention strengthens the anti-tumble capability of the transportation vehicle during turning, and enhances the stability and safety of the transportation vehicle in usage.

Said rocker arm connecting rod mechanism includes rocker arm 8 and bar-shaped, vertically configured second push-pull rod 9; to enhance flexibility of the connection between the first push-pull rod 7, rocker arm 8, second push-pull rod 9 and wheel hub axles 6, and ensure flexible coordination of each parts when the transportation vehicle is traveling, and also to ensure safety of the transportation vehicle in motion, the first push-pull rod 7, rocker arm 8, second push-pull rod 9 and wheel hub axles 6 are serially connected through ball-head structures; in particular, the rocker arm 8 is roughly in a 7 shape, with its folding position hinged on the front frame 1, and the hinge point between the rocker arm 8 and front frame 1 is located between the connecting point of the first push-pull rod 7 and rocker arm 8 and the connecting point of the rocker arm 8 and second push-pull rod 9; the second push-pull rod 9 is bar-shaped, the upper end of the second push-pull rod 9 connected to the rocker arm 8, the lower end of the second push-pull rod 9 connected to the wheel hub axle 6;

By adopting ball-head structures as the connecting structures between the first push-pull rod 7, rocker arm 8, second push-pull rod 9 and wheel hub axles 6, the present invention realizes flexible connection between the first push-pull rod 7, rocker arm 8, second push-pull rod 9 and wheel hub axles 6, and ensures flexible coordination between each of the parts during motion of the transportation vehicle. Thus, it also ensures safety of the transportation vehicle in usage.

Figure 2:
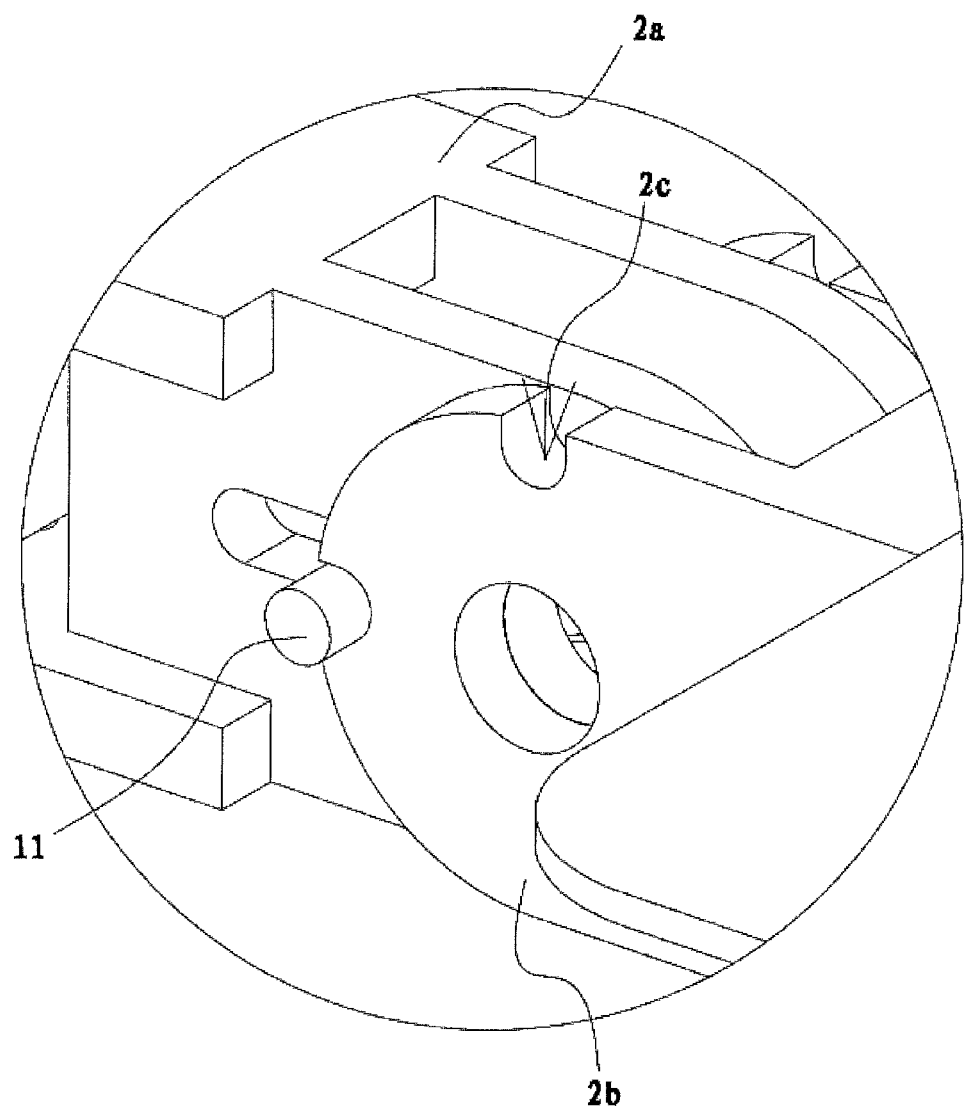
FIG. 2 is an enlarged view of Part A in FIG. 1.

For flexible folding, the rear frame 2 includes a subframe 2a and a long bar-shaped main frame 2b. The driving wheel 3 is configured on the main frame 2b, the main frame 2b is hinged to the subframe 2a and the main frame 2b can swing up and down with respect to the subframe 2a, the subframe 2a is hinged to the front frame 1 and the subframe 2a can swing left and right with respect to the front frame 1, and between the main frame 2b and subframe 2a, a locking mechanism is provided to control tumbling of the main frame 2b relative to the subframe 2a;

The main frame 2b is hinged to the subframe 2a and the main frame 2b can swing up and down with respect to the subframe 2a. That means, the rotation axle at the hinge point between the main frame 2b and subframe 2a is horizontal; through function of the locking mechanism, the main frame 2b can be shifted between the folded state and unfolded state. Therefore, the transportation vehicle can be conveniently used, carried and stored;

In particular, as depicted in FIG. 2, the locking mechanism includes a locking piece 11 configured on the subframe 2a, and the main frame 2b is provided with two locking slots 2c for the locking piece 11 to insert into, and when the locking piece 11 is inserted into different locking slots 2c on the main frame 2b, the main frame 2b and subframe 2a are folded or unfolded. A spring is provided on the subframe 2a. The two ends of the spring are respectively connected to the subframe 2a and locking piece 11. Under the force of the spring, the locking piece 11 has a tendency to insert into the locking slot 2c;

By configuring the spring and locking piece 11, the transportation vehicle can be stably maintained in the folded or unfolded state. Stability of the structure is ensured.

Figure 5:
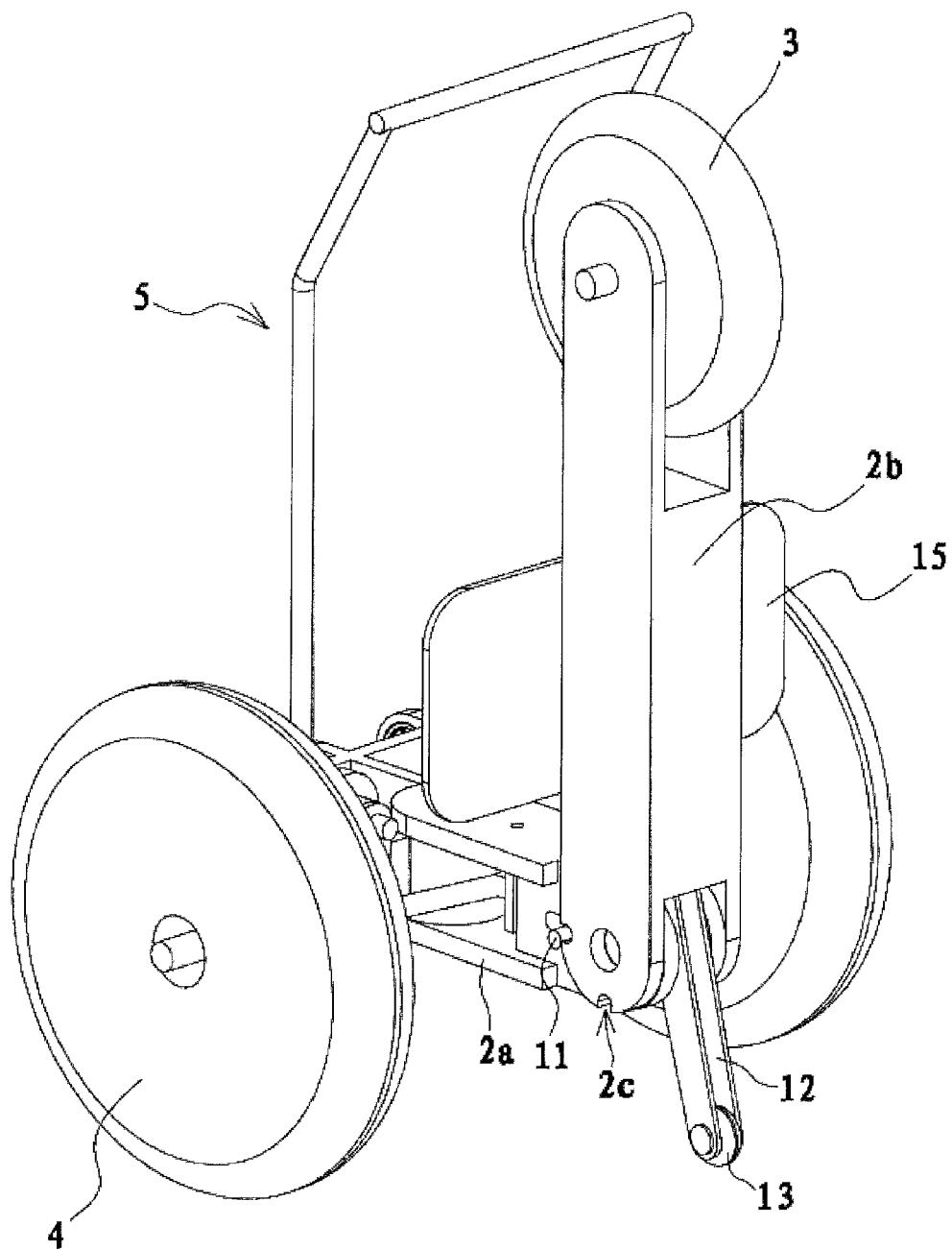
FIG. 5 is a schematic view of the present invention when folded.
Figure 6:
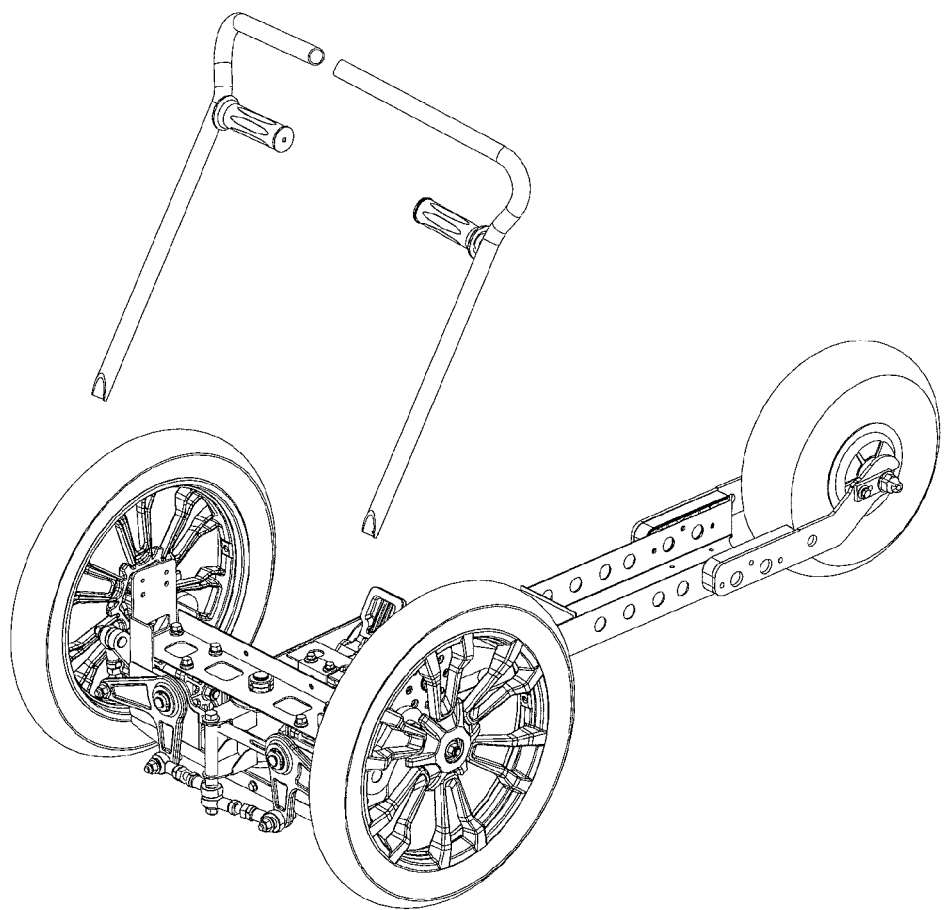
FIG. 6 is a schematic view of another embodiment of the present invention.
Figure 7:
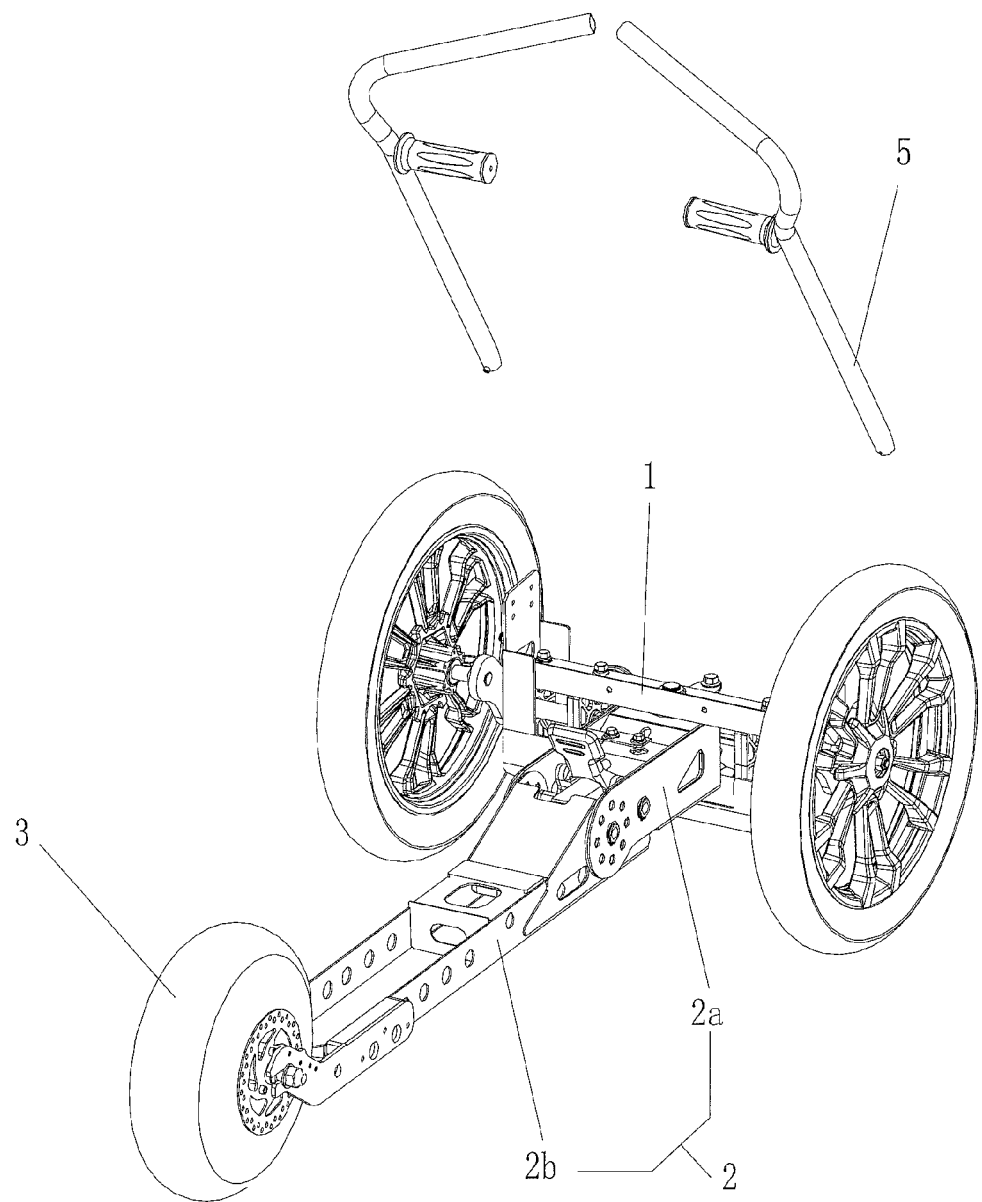
FIG. 7 is a schematic view of another embodiment of the present invention from another angle.

In order for stable positioning and convenient carrying of the folded transportation vehicle, as depicted in FIG. 5, a support rod 12 is configured on the end of the main frame 2b hinging to the subframe 2a, one end of the support rod 12 is fixed on the main frame 2b, the other end of the support rod 12 is provided with a support wheel 13. When the main frame 2b is folded, the support rod 12 will extend out of the main frame 2b.

The working principle of the present invention is as follows:

When driving the vehicle, the user steps on the footboard 15 and grips the handle 5; as the driving wheel 3 and two driven wheels 4 simultaneously support the transportation vehicle to than three support points, making the transportation vehicle more stable in normal driving;

When there is a need to make a left turn during traveling, the user grips the handle 5 and turns the handle 5; at this time, the user and the transportation vehicle both generate a centrifugal force toward the right; as the handle 5 and front frame 1 are fixed and connected together, and the front frame 1 and rear frame 2 are hinged together, the front frame 1 will swing with respect to the rear frame 2; at the same time, the first push-pull rod 7 connected to the rear frame 2 will also swing along with the rear frame 2 with respect to the front frame 1; the left end of the first push-pull rod 7 will, through connection of the rocker arm connecting rod mechanism, drive the left wheel hub axle 6 to swing upward, i.e., the wheel hub axle 6 will entirely swing upward around the axis of the connecting portion 6a; thus, the driven wheel 4 located on the left side of the front frame 1 will rise with respect to the front frame 1; similarly, the driven wheel 4 located on the right side of the front frame 1 will decline with respect to the front frame 1; during this process, the front frame 1 and rear frame 2 will both tilt toward the left side to offset the centrifugal force toward the right side when the user and transportation vehicle is making a left turn; similarly, when the transportation vehicle needs to turn right, the front frame 1 and rear frame 2 will both tilt toward the right side to offset the centrifugal force toward the left side when the user and transportation vehicle is making a right turn.

To fold the transportation vehicle, the user can directly or indirectly push the locking piece 11 out of the locking slot 2c, turn the main frame 2b, to make the main frame 2b rotate upward with respect to the subframe 2a, and complete the folding. Then, under the function of the spring, the locking piece 11 will automatically snap into the other locking slot 2c, so that the transportation vehicle is locked in the folded state for easy storage.

When the transportation vehicle is folded, the support wheel 13 and two driven wheels 4 simultaneously support the transportation vehicle and form three support points, so that the folded transportation vehicle can be placed stably; moreover, the three-point support formed by the support wheel 13 and two driven wheels 4 also provides convenience for moving the folded transportation vehicle.

Another embodiment of the present invention is depicted in FIGS. 6~9. The vertically configured connecting rod 10 is connected to the subframe 2a of the rear frame 2 and located in front of the front frame 1, meanwhile, the first push-pull rod 7, rocker arm 8, and second push-pull rod 9 are also positioned in front of the front frame 1; the middle portion of the first push-pull rod 7 is connected to the connecting rod 10 through the rod-end knuckle bearing;

The first push-pull rod 7, rocker arm 8, second push-pull rod 9 and wheel hub axle 6 are connected serially; in particular, the rocker arm 8 is roughly in a 7 shape, with its folding position hinged to the front frame 1, and the hinge point between the rocker arm 8 and front frame 1 is located between the connecting point of the first push-pull rod 7 and rocker arm 8 and the connecting point of the rocker arm 8 and second push-pull rod 9;

The second push-pull rod 9 is in a bar shape. The upper end of the second push-pull rod 9 is connected to the wheel hub axle support portion 6c through the rocker arm portion 6b, and the lower end of the second push-pull rod 9 is connected to the rocker arm 8;

The first push-pull rod 7 is a universal steering structure. The universal steering structure includes left pull rod 7-1 and right pull rod 7-2. The inner sides of the left pull rod 7-1 and right pull rod 7-2 are configured with rod-end knuckle bearings; the inner ring body 7-5 of the rod-end knuckle bearing on the inner side of the left pull rod 7-1 is fixed and connected to the inner ring body 7-4 of the rod-end knuckle bearing on the inner side of the right pull rod 7-2 to form an integral body, which is then connected to the connecting rod 10.

The connecting portion 6a between the rocker arm portion 6b and front frame 1 are provided on the front frame 1 through two bearings 14, and the two bearings 14 are respectively equipped on the two ends of the connecting portion 6a.

Figure 8:
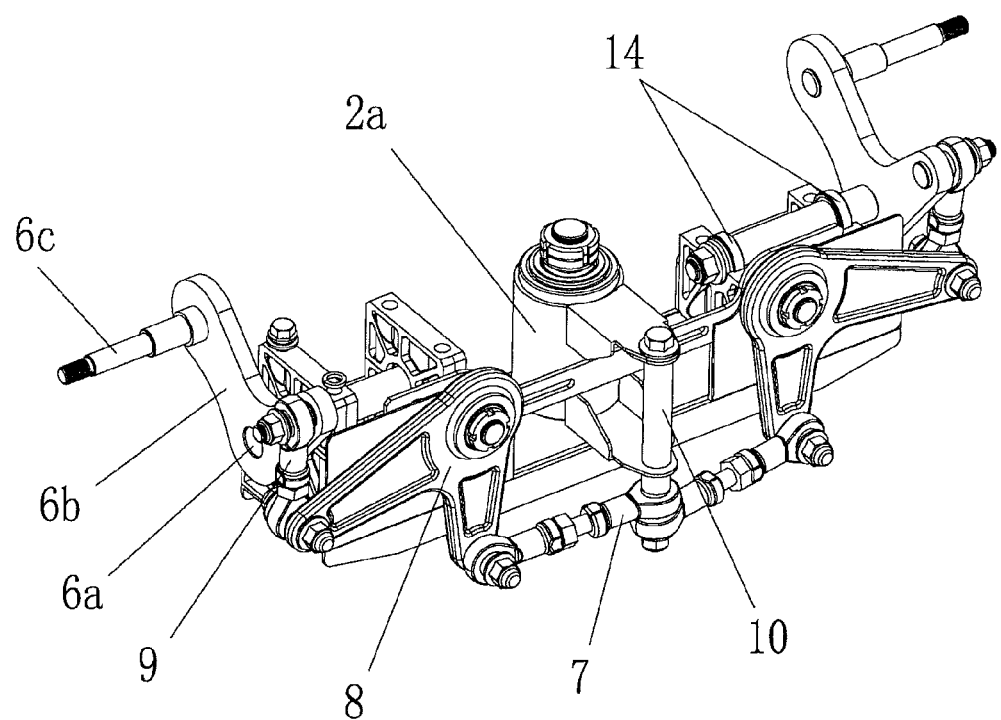
FIG. 8 is schematic partial view of another embodiment of the present invention.
Figure 9:
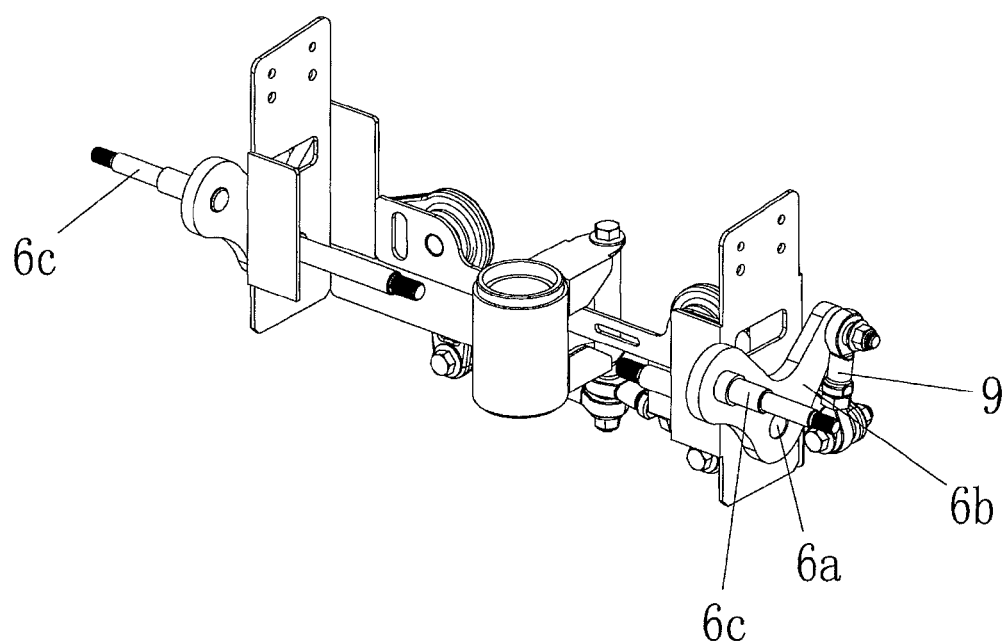
FIG. 9 is schematic back view of FIG. 8.
Figure 10:
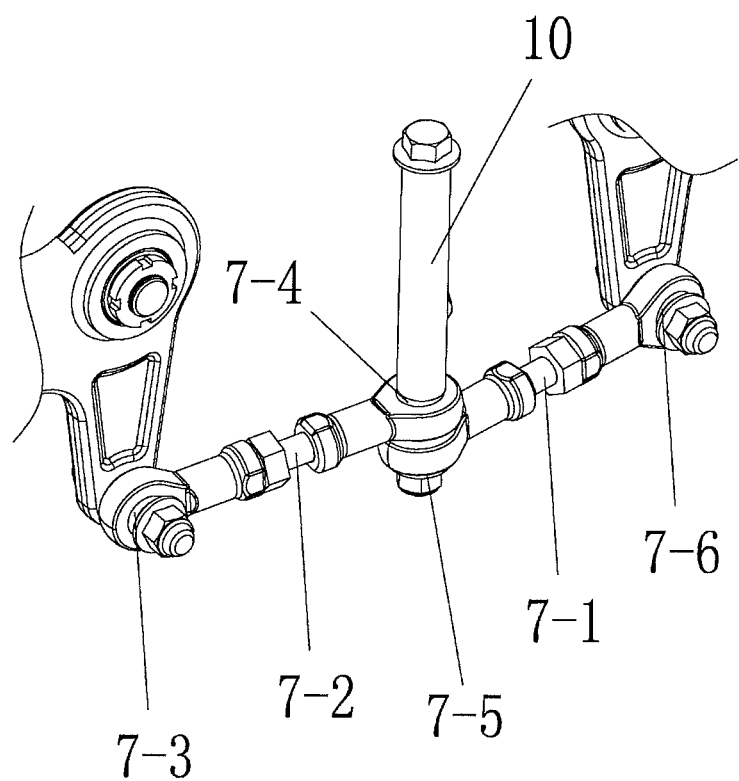
FIG. 10 is a perspective view of the first push-pull rod in another embodiment of the present invention.

As depicted in FIGS. 8 and 9, the wheel hub axle 6 in the present embodiment includes connecting portion 6a, rocker arm portion 6b and support portion 6c;

The rocker arm portion 6b is roughly in a 7 shape; the rocker arm portion 6b is hinged to the front frame through the connecting portion 6a; the connecting portion 6a is located between the connecting point of the second push-pull rod 9 and rocker arm portion 6b and the connecting point of the rocker arm portion 6b and support portion 6c.

The working principle of the present invention is as follows:

When there is a need to turn left during the travel, the user grips the handle 5 and turns the handle 5; during this process, the user and transportation vehicle will both generate a centrifugal force toward right; as the handle 5 and front frame 1 are fixed and connected together, and the front frame 1 and rear frame 2 are hinged together, the front frame 1 will swing with respect to the rear frame 2; at the same time, the first push-pull rod 7 connected to the rear frame 2 will swing along with the rear frame 2 with respect to the front frame 1; the left end of the first push-pull rod 7 will, through connection of the rocker arm connecting rod mechanism, drive the left wheel hub axle 6 to swing upward, i.e., the support portion 6c of the wheel hub axle 6 will swing upward around the connecting portion 6a; thus, the driven wheel 4 located on the left side of the front frame 1 will rise with respect to the front frame 1; similarly, the driven wheel 4 located on the right side of the front frame 1 will decline with respect to the front frame 1; during this process, the front frame 1 and rear frame 2 will both tilt toward the left side to offset the centrifugal force toward the right side when the user and transportation vehicle is making a left turn; similarly, when the transportation vehicle needs to turn right, the front frame 1 and rear frame 2 will both tilt toward the right side to offset the centrifugal force toward the left side when the user and transportation vehicle is making a right turn.

What is claimed is:

1. A transportation vehicle comprising:
    a front frame (1) and a rear frame (2), the rear frame (2) connected with a driving wheel (3), the front frame (1) having two driven wheels (4) disposed on both sides thereof;
    wherein the front frame (1) and the rear frame (2) are hinged together and the rear frame (2) can swing left and right with respect to the front frame (1), the front frame (1) having a handle (5) connected thereto and two wheel hub axles (6) disposed on both sides thereof; the driven wheels (4) being connected to the front frame (1) through the wheel hub axles (6);
    wherein the wheel hub axles (6) include a connecting portion (6a), a rocker arm portion (6b) and a support portion (6c); a second push-pull rod (9) is connected to the support portion (6c) through the rocker arm portion (6b); the connecting portion (6a) is hinged to the front frame (1); and the connecting portion (6a) is located between the connecting point of the second push-pull rod (9) and rocker arm portion (6b) and the connecting point of the rocker arm portion (6b) and support portion (6c);
    wherein the rear frame (2) comprises a vertically configured connecting rod (10) and a first push-pull rod (7) flexibly connected to a middle portion of the connecting rod (10), the first push-pull rod (7) having two ends capable of swinging up and down;
    wherein the first push-pull rod (7) includes a left pull rod (7-1) and a right pull rod (7-2); the inner sides of the left pull rod (7-1) and right pull rod (7-2) each include a rod-end knuckle bearing with an inner ring body (7-5) of the rod-end knuckle bearing on the inner side of the left pull rod (7-1), the rod-end knuckle bearing is fixed and connected to an inner ring body (7-4) of the rod-end knuckle bearing on the inner side of the right pull rod (7-2) to form an integral body, which is then connected to the connecting rod (10);
    wherein the two ends of the first push-pull rod (7) are respectively connected to the wheel hub axles (6) through a rocker arm connecting rod mechanism, and when the rear frame (2) swings toward one of the wheel hub axles (6), through synchronous motion of the first push-pull rod (7), the rocker arm connecting rod mechanism close to this wheel hub axle (6) will drive the wheel hub axle (6) to swing upward, and the other rocker arm connecting rod mechanism will drive the other wheel hub axle (6) to swing downward.

2. The transportation vehicle of claim 1 wherein the rocker arm connecting rod mechanism comprises a rocker arm (8) and a bar-shaped, vertically configured second push-pull rod (9), the first push-pull rod (7), the rocker arm (8); the second push-pull rod (9) and the wheel hub axle (6) being connected serially; a folding position of the rocker arm (8) being hinged to the front frame (1), and the hinge point between the rocker arm (8) and front frame (1) being located between the connecting point of the first push-pull rod (7) and rocker arm (8) and the connecting point of the rocker arm (8) and second push-pull rod (9).

3. The transportation vehicle of claim 1 wherein the rear frame (2) comprises a subframe (2a) and a long bar-shaped main frame (2b); the driving wheel (3) is configured on the main frame (2b), the main frame (2b) is hinged to the subframe (2a) and the main frame (2b) can swing up and down with respect to the subframe (2a), the subframe (2a) is hinged to the front frame (1) and the subframe (2a) can swing left and right with respect to the front frame (1), and between the main frame (2b) and subframe (2a), a locking mechanism is provided to control tumbling of the main frame (2b) relative to the subframe (2a).

4. The transportation vehicle of claim 3 wherein the locking mechanism comprises a locking piece (11) configured on the subframe (2a), and the main frame (2b) is provided with two locking slots (2c) for the locking piece (11) inserted therein, and when the locking piece (11) is inserted into different locking slots (2c) on the main frame (2b), the main frame (2b) and subframe (2a) are folded or unfolded.

5. The transportation vehicle of claim 3 wherein the main frame (2b) comprises a support rod (12) configured on one end of hinging to the subframe (2a); one end of the support rod (12) is fixed on the main frame (2b), the other end of the support rod (12) is provided with a support wheel (13); when the main frame (2b) is folded, the support rod (12) will extend out of the main frame (2b).

6. The transportation vehicle of claim 1 wherein said handle (5) comprises two vertically configured vertical bars (5a) and a horizontal bar (5b) positioned on top of and between the two vertical bars (5a), the lower ends of the vertical bars (5a) both being fixed on the front frame (1), and the two ends of the horizontal bar (5b) being fixed with the top ends of the two vertical bars (5a).

7. The transportation vehicle of claim 6 wherein the top end of the vertical bars (5a) is provided with a bent portion (5c), the bent portion (5c) being bent toward the rear frame (2).

8. The transportation vehicle of claim 1 wherein the connecting portion (6a) is bar-shaped, the connecting portion (6a) is configured horizontally and fixed on the front frame (1) in the axial direction; the two ends of the rocker arm portion (6b) are respectively connected to the connecting portion (6a) and support portion (6c); the driven wheels (4) are equipped on the support portions (6c); the axial line of the two support portions (6c) is parallel to the axial line of the connecting portion (6a), and the support portions (6c) can swing around the axial line of the connecting portion (6a), and drive the driven wheels (4) to move up and down.

9. The transportation vehicle of claim 8 wherein the middle portion of the first push-pull rod (7) is hinged to the middle portion of the connecting rod (10).

10. The transportation vehicle of claim 8 wherein the connecting portion (6a) of the wheel hub axle (6) is fixed on the front frame (1) through two bearings (14), and the two bearings (14) are respectively equipped on the two ends of the connecting portion (6a).

11. The transportation vehicle of claim 1 wherein the connecting portion (6a) between the rocker arm portion (6b) and front frame (1) are provided on the front frame (1) through two bearings (14), and the two bearings (14) are respectively equipped on the two ends of the connecting portion (6a).

* * * * *